United States Patent [19]

Chambers, Jr. et al.

[11] 3,818,151

[45] June 18, 1974

[54] METHOD AND APPARATUS FOR AMPLIFYING SIGNAL TRANSMISSION THROUGH TRANSMISSION LINES

[75] Inventors: Charles W. Chambers, Jr., Amherst; Frederick J. Kiko, Sheffield Village, both of Ohio

[73] Assignee: Lorain Products Corporation

[22] Filed: Jan. 26, 1973

[21] Appl. No.: 326,785

[52] U.S. Cl. .......... 179/170 T, 179/170 R, 179/16 F

[51] Int. Cl. .......................................... H04b 3/36

[58] Field of Search ............ 179/170 T, 170 R, 16 F

[56] References Cited

UNITED STATES PATENTS 3,706,862 12/1972 Chambers, Jr. ................. 179/170 T

*Primary Examiner*—Ralph D. Blakeslee

*Assistant Examiner*—Mitchell Saffian

[57] ABSTRACT

A circuit for increasing the amplitude of signals transmitted through a two-wire transmission line. Amplifying voltage generating means generates and introduces in series with the transmission line an amplifying voltage that varies in accordance with the signal voltage across the transmission line. Amplifying current generating means generates and introduces in shunt with the transmission line an amplifying current that varies in accordance with the signal current through the transmission line. Gain control means varies the ratio of amplifying voltage to signal voltage and the ratio of amplifying current to signal current, as a function of frequency, to provide frequency compensated gain and impedance matching for each frequency in the band of frequencies to be transmitted through the transmission line.

35 Claims, 2 Drawing Figures

(1) $R_A = \frac{V_1+V_2+V_3+V_4}{V_L}$ (2) $R_B = \frac{I_S}{(I_{L1}+I_{L2})/2}$ (3) $G_{10} = \frac{\frac{Z_{10}+Z_{11}}{Z_{11}}}{\frac{(2-R_A)}{(2+R_A)} + \frac{Z_{10}}{Z_{11}} \quad \frac{(2-R_B)}{(2+R_B)}}$ (4) $G_{11} = \frac{\frac{Z_{10}+Z_{11}}{Z_{10}}}{\frac{(2+R_A)}{(2-R_A)} + \frac{Z_{11}}{Z_{10}} \quad \frac{(2+R_B)}{(2-R_B)}}$ (5) $Z_{R11} = Z_{11} \cdot \frac{4+2(R_B-R_A)-R_A R_B}{4-2(R_B-R_A)-R_A R_B}$ (6) $Z_{R10} = Z_{10} \cdot \frac{4-2(R_B-R_A)-R_A R_B}{4+2(R_B-R_A)-R_A R_B}$ (7) $G_{10/10}(f) = G_{11/11}(f)$ (8) $G_{10/11}(f) = G_{11/10}(f)$ (9) $G_{10/0}(f) = G_{11/0}(f) = 1$

(10) $G_{10/10}(f) = C \cdot A(f)$

(11) $Z_{R11/10}(f) = Z_{R11/11}(f) = Z_{R11/0}(f) = Z_{10}(f)$

(12) $Z_{R10/10}(f) = Z_{R10/11}(f) = Z_{R10/0}(f) = Z_{11}(f)$

(13) $G_{10/10} = C \cdot A = \frac{\frac{Z_{10}+Z_{11}}{Z_{11}}}{\frac{2-R_{A/10}}{2+R_{A/10}} + \frac{Z_{10}}{Z_{11}} \cdot \frac{2-R_{B/10}}{2+R_{B/10}}}$

(14) $Z_{R11/10} = Z_{10} = Z_{11} \cdot \frac{4+2(R_{B/10}-R_{A/10})-R_{A/10}R_{B/10}}{4-2(R_{B/10}-R_{A/10})-R_{A/10}R_{B/10}}$

(15) $G_{11/11} = C \cdot A = \frac{\frac{Z_{10}+Z_{11}}{Z_{10}}}{\frac{2+R_{A/11}}{2-R_{A/11}} + \frac{Z_{11}}{Z_{10}} \cdot \frac{2+R_{B/11}}{2-R_{B/11}}}$

(16) $Z_{R10} = Z_{11} = Z_{10} \cdot \frac{4-2(R_{B/11}-R_{A/11})-R_{A/11}R_{B/11}}{4+2(R_{B/11}-R_{A/11})-R_{A/11}R_{B/11}}$

(17) $G_{10/0} = 1 = \frac{\frac{Z_{10}+Z_{11}}{Z_{11}}}{\frac{2-R_{A/0}}{2+R_{A/0}} + \frac{Z_{10}}{Z_{11}} \cdot \frac{2-R_{B/0}}{2+R_{B/0}}}$

(18) $Z_{R11/0} = Z_{10} = Z_{11} \cdot \frac{4+2(R_{B/0}-R_{A/0})-R_{A/0}R_{B/0}}{4-2(R_{B/0}-R_{A/0})-R_{A/0}R_{B/0}}$

FIG. 1

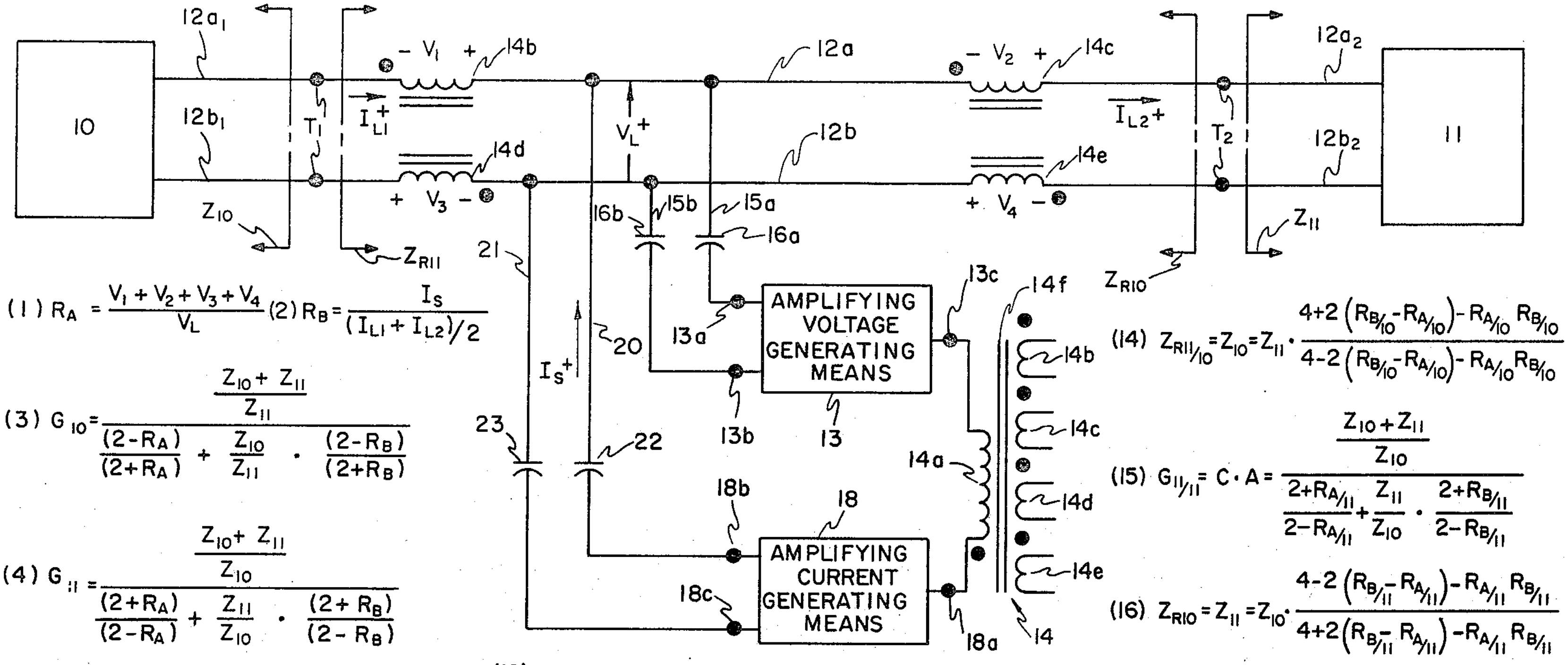

(1) $R_A = \frac{V_1 + V_2 + V_3 + V_4}{V_L}$ (2) $R_B = \frac{I_S}{(I_{L1} + I_{L2})/2}$ (3) $$G_{10} = \frac{\frac{Z_{10} + Z_{11}}{Z_{11}}}{\frac{(2-R_A)}{(2+R_A)} + \frac{Z_{10}}{Z_{11}} \cdot \frac{(2-R_B)}{(2+R_B)}}$$

(4) $$G_{11} = \frac{\frac{Z_{10} + Z_{11}}{Z_{10}}}{\frac{(2+R_A)}{(2-R_A)} + \frac{Z_{11}}{Z_{10}} \cdot \frac{(2+R_B)}{(2-R_B)}}$$

(5) $$Z_{R11} = Z_{11} \cdot \frac{4 + 2(R_B - R_A) - R_A R_B}{4 - 2(R_B - R_A) - R_A R_B}$$

(6) $$Z_{R10} = Z_{10} \cdot \frac{4 - 2(R_B - R_A) - R_A R_B}{4 + 2(R_B - R_A) - R_A R_B}$$

(7) $G_{10/10}(f) = G_{11/11}(f)$ (8) $G_{10/11}(f) = G_{11/10}(f)$ (9) $G_{10/0}(f) = G_{11/0}(f) = 1$

(10) $G_{10/10}(f) = C \cdot A(f)$

(11) $Z_{R11/10}(f) = Z_{R11/11}(f) = Z_{R11/0}(f) = Z_{10}(f)$

(12) $Z_{R10/10}(f) = Z_{R10/11}(f) = Z_{R10/0}(f) = Z_{11}(f)$

(13) $$G_{10/10} = C \cdot A = \frac{\frac{Z_{10} + Z_{11}}{Z_{11}}}{\frac{2 - R_{A/10}}{2 + R_{A/10}} + \frac{Z_{10}}{Z_{11}} \cdot \frac{2 - R_{B/10}}{2 + R_{B/10}}}$$

(14) $$Z_{R11/10} = Z_{10} = Z_{11} \cdot \frac{4 + 2(R_{B/10} - R_{A/10}) - R_{A/10} R_{B/10}}{4 - 2(R_{B/10} - R_{A/10}) - R_{A/10} R_{B/10}}$$

(15) $$G_{11/11} = C \cdot A = \frac{\frac{Z_{10} + Z_{11}}{Z_{10}}}{\frac{2 + R_{A/11}}{2 - R_{A/11}} + \frac{Z_{11}}{Z_{10}} \cdot \frac{2 + R_{B/11}}{2 - R_{B/11}}}$$

(16) $$Z_{R10} = Z_{11} = Z_{10} \cdot \frac{4 - 2(R_{B/11} - R_{A/11}) - R_{A/11} R_{B/11}}{4 + 2(R_{B/11} - R_{A/11}) - R_{A/11} R_{B/11}}$$

(17) $$G_{10/0} = 1 = \frac{\frac{Z_{10} + Z_{11}}{Z_{11}}}{\frac{2 - R_{A/0}}{2 + R_{A/0}} + \frac{Z_{10}}{Z_{11}} \cdot \frac{2 - R_{B/0}}{2 + R_{B/0}}}$$

(18) $$Z_{R11/0} = Z_{10} = Z_{11} \cdot \frac{4 + 2(R_{B/0} - R_{A/0}) - R_{A/0} R_{B/0}}{4 - 2(R_{B/0} - R_{A/0}) - R_{A/0} R_{B/0}}$$

METHOD AND APPARATUS FOR AMPLIFYING SIGNAL TRANSMISSION THROUGH TRANSMISSION LINES

BACKGROUND OF THE INVENTION

The present invention relates to a method and apparatus for amplifying a-c voltages and currents and is directed more particularly to a method and apparatus for providing frequency and impedance compensated amplification for signals transmitted through transmission lines such as two-wire telephone lines, and thereby improving the quality of voice transmission therethrough.

In communication systems wherein voice signals are transmitted over substantial distances through transmission lines it is necessary to provide circuitry which can compensate for the attenuation of the signal by the transmission line. In telephone systems, for example, it is necessary to provide amplifier circuits or repeaters to maintain satisfactory signal transmission through telephone lines which, in the absence of such circuits, would excessively attenuate signals transmitted therethrough. One particularly advantageous type of amplifier is the syllabically switched amplifier described in the U.S. patent of Charles W. Chambers, Jr., U.S. Pat. No. 3,706,862, issued on Dec. 19, 1972.

In amplifier circuits of the above type, a series amplifying network introduces a voltage in series with the transmission line and varies that voltage in accordance with the signal voltage across the transmission line. At the same time, a shunt amplifying network introduces a current in shunt with the transmission line and varies that current in accordance with the signal current through the transmission line. Together, the amplifying voltages and currents increase the level of signal transmission and thereby provide an overall gain to signals transmitted through the transmission line.

One problem with transmission lines is that they exhibit distributed resistance and capacitance which cause the attenuation introduced by the transmission line to vary over a wide range as the frequency of the transmitted signal varies over the band of frequencies from, for example, 0 hertz to 3,000 hertz. This attenuation-frequency characteristic may be of the type in which signal attenuation increases continuously with frequency, for example, the attenuation characteristic of a non-loaded line, or may be of the type in which signal attenuation is only roughly constant with frequency over the band of frequencies being transmitted, for example, the attenuation characteristic of a loaded line. Such frequency dependent attenuation characteristics are not significantly altered by presently available repeaters with the result that the percentage of the transmitted signal which arrives at the receiving end of a transmission line differs substantially from one part of the transmission band to another. This lack of uniformity of transmission is manifested as distortion or lack of fidelity in the sound reproduced at the receiving end of the transmission line.

Another problem with transmission lines is that the impedance thereof is dependent upon the direction in which the impedance is measured. When, for example, a transmission line is opened at a point along its length where an amplifier might be located, it is often found that the impedance looking into the transmission line in one direction is substantially different from the impedance looking into the transmission line in the opposite direction. In the presence of an amplifier, this mismatch in line impedances can give rise to signal reflections and to less than complete transmission of signal power through the amplifier. Accordingly, amplifiers are usually coupled to a transmission line through a pair of line build-out networks which match the impedance looking into the line through the repeater to the impedance of the line looking toward each party, this being accomplished at the expense of further attenuating the transmitted signal.

In accordance with the present invention, there is provided an improved method and apparatus for amplifying signal transmission through a transmission line while substantially eliminating the frequency dependent attenuation of such signal transmission by the transmission line. There is also provided an improved method and apparatus for substantially matching the impedance of an amplifier to the impedance of a transmission line, looking toward either party, and thereby eliminating the need for line build-out networks. Thus, there is provided, by the present invention, improved circuitry which not only affords louder or higher amplitude signal reception but also improves the fidelity of the signal reception by eliminating frequency distortion and by providing improved impedance matching characteristics, all to the end of affording unusually clear, stable, undistorted telephone communication.

SUMMARY OF THE INVENTION

It is an object of the invention to provide an improved method and apparatus for increasing the amplitude of signal transmission through transmission lines such as telephone transmission lines.

Another object of the invention is to provide a method and apparatus for increasing the amplitude of signal transmission and, at the same time, reducing the signal distortion introduced by a transmission line which has a frequency dependent attenuation characteristic.

It is another important object of the invention to provide an improved method and apparatus for amplifying signal transmission through both loaded and non-loaded transmission lines.

Yet another object of the invention is to provide a method and apparatus for affording signal amplification which varies with the frequency of signal transmission, as required, to compensate for the frequency dependent attenuation of a transmission line, for both directions of transmission therethrough.

Another object of the invention is to provide a method and apparatus for matching the impedances of a transmission line looking in both directions to the impedances of the line looking in the remaining directions for all frequencies in the band of frequencies being transmitted.

It is yet another object of the invention to provide an amplifier circuit which includes frequency compensating circuitry which varies the amplitudes of each of the different frequency components of a given transmitted multi-frequency signal in accordance with the individual frequency of each of those components to counteract the frequency dependent attenuation thereof by the transmission line. In this manner the relative amplitudes of the different frequency components of any received signal are the same as the relative amplitudes of the different frequency components of the transmitted signal.

It is still another object of the invention to provide an amplifier circuit which includes impedance compensating circuitry for matching the impedance of the amplifier to the impedance of the transmission line for each frequency in the transmission band.

Yet another object of the invention is to provide an amplifier circuit of the above character in which the overall or composite gain, to be defined more specifically hereafter, provided during dominant or higher amplitude transmission in a first direction is substantially equal to the overall or composite gain provided thereby during dominant transmission in the other or second direction.

Still another object of the invention is to provide an amplifier circuit of the above character which remains stable while providing a composite gain that is substantially larger than the gain at which previously available amplifier circuits become unstable.

It is another object of the invention to provide an amplifier circuit which includes amplifying voltage generating means for generating and introducing in series with the transmission line an amplifying voltage which varies in accordance with the signal voltage across the transmission line, amplifying current generating means for generating and introducing in shunt with the transmission line an amplifying current which varies in accordance with the signal current through the transmission line and gain control means for varying the ratio of amplifying voltages and currents to signal voltages and currents, respectively, as required, to provide frequency compensated gain and impedance matching for each frequency in the transmission band.

For the purpose of this description of the present invention the term "dominant" is here used to identify the one station, in a two-station communication system which, at any given time, transmits a signal of a greater amplitude than that of the other station whether the greater amplitude arises because of the absence of transmission by the other station or because of the simultaneous transmission by that other station of a signal of lower amplitude. The term "non-dominant" is used herein to identify the station which transmits the lower amplitude signal.

DESCRIPTION OF THE DRAWINGS

FIG. 1 is a combined block-schematic diagram which illustrates one embodiment of the amplifying method and apparatus of the invention.

DESCRIPTION OF THE INVENTION

Figure 2:
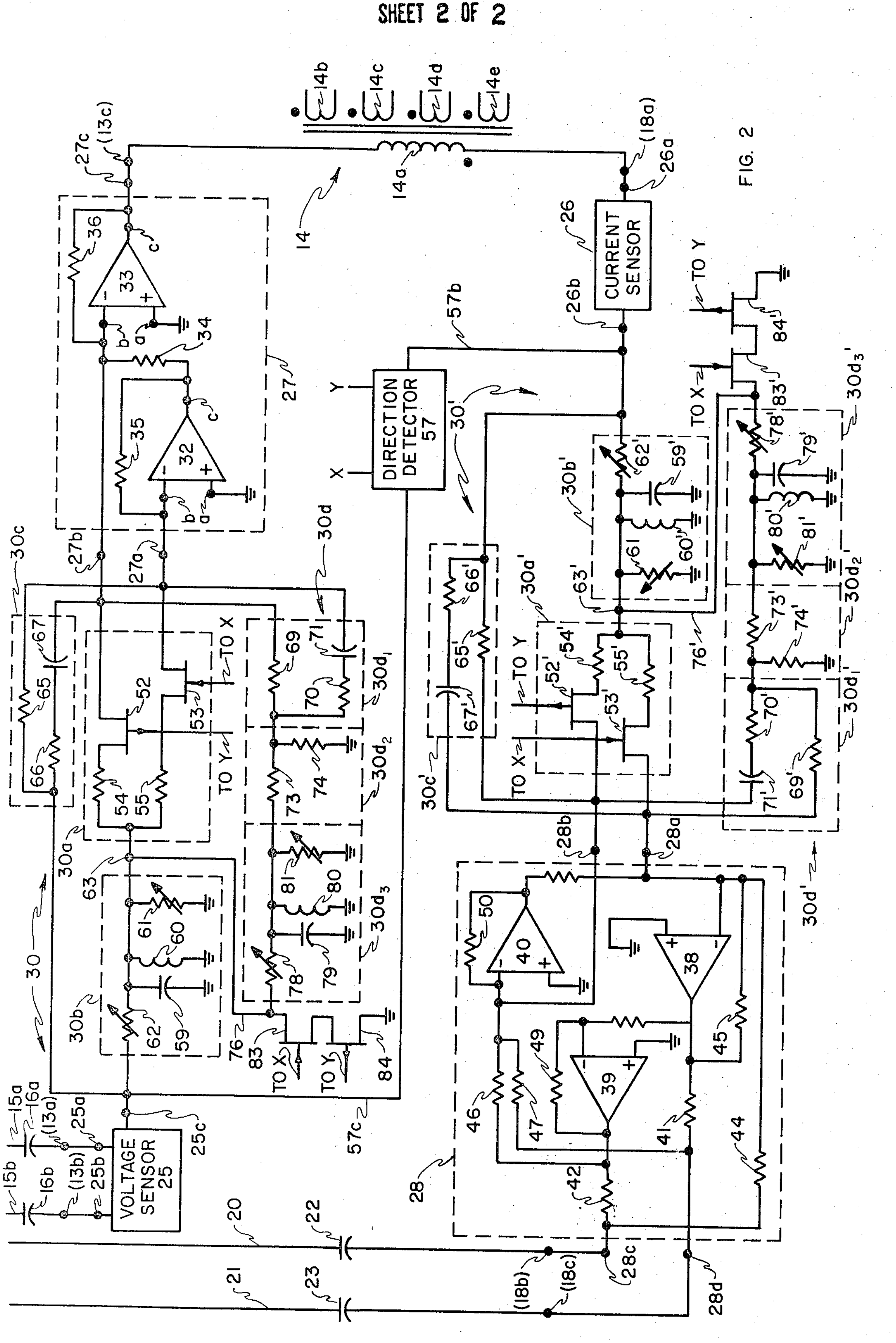
FIG. 2 is a schematic diagram showing one exemplary realization of the apparatus shown in FIG. 1.

Referring to FIG. 1, there is shown a transmitting-receiving station 10 for transmitting signals to and receiving signals from a transmitting-receiving station 11 through the conductor pairs $12a_1$ and $12a_2$ and $12b_1$ and $12b_2$ of a two-wire transmission line. Stations 10 and 11 may, for example, comprise telephone sets which are connected through the conductors of a two-wire telephone line.

To the end that there may be introduced in series with the transmission line an amplifying voltage which is in aiding relationship to the signal voltage transmitted by the then dominant or louder talking party, there is provided amplifying voltage generating means 13 having input terminals **13*a* and 13*b* and an output terminal 13*c*. The amplifying voltage generated by generating means 13 appears at output 13*c* thereof and is applied to line conductors 12*a* and 12*b* through voltage output coupling means which here takes the form of a transformer 14 having a primary winding 14*a* and secondary windings 14*b*, 14*c*, 14*d* and 14*e* which may be located on the common core 14*f*. The magnitude of the amplifying voltage is controlled in accordance with the amplitude of the transmitted signal by connecting generator inputs 13*a* and 13*b* across line conductors 12*a* and 12*b* through sensing conductors 15*a* and 15*b* and through voltage input coupling means which here take the form of capacitors 16*a* and 16*b*. Thus, voltage generating means 13** senses the signal voltage across the transmission line and introduces in series with the transmission line an amplifying voltage which varies in accordance therewith.

To the end that there may be introduced in shunt with the transmission line an amplifying current which is in aiding relationship to the signal current transmitted by the dominant or louder talking party, there is provided amplifying current generating means 18 having an input terminal **18*a* and output terminals 18*b* and 18*c*. The amplifying current generated by generating means 18 appears at outputs 18*b* and 18*c* thereof and is applied to line conductors 12*a* and 12*b* through current output coupling means which here takes the form of conductors 20 and 21 and capacitors 22 and 23. The magnitude of the amplifying current is controlled in accordance with the amplitude of the transmitted signal by connecting generator input 18*a* in current sensing relationship to the transmission line through transformer 14 which serves as current input coupling means. Thus, shunt current generating means 18** senses the signal current through the transmission line and introduces in shunt with the transmission line an amplifying current which varies in accordance therewith.

As will be seen presently, there is provided by the present invention a novel structure and method which economically and efficiently manipulates the amplitudes of the amplifying voltages and currents over a band of voice frequencies to perform highly advantageous functions, whereby voice transmission is greatly improved, these functions being capable of precise mathematical explanation as presented herein.

Voltage generating means 13 and current generating means 18 operate simultaneously to control the amplitudes of the signal voltages and currents transmitted in the dominant direction of transmission. Accordingly, the amplification provided by the invention is a function both of the gain of voltage generating means 13 and of the gain of current generating means 18. For purposes of description, the gain $R_A$ provided by voltage generating means 13 is hereinafter referred to as the series gain and is defined as the ratio of the sum of the substantially equal amplifying voltages $V_1$, $V_2$, $V_3$ and $V_4$ across windings **14*b*, 14*c*, 14*d* and 14*e*, respectively, to the signal voltage $V_L$ between conductors 15*a* and 15*b*, as shown in equation (1) of FIG. 1. In interpreting equation (1), each amplifying voltage is considered positive when it has the polarity shown in FIG. 1. Similarly, the gain $R_B$ provided by current generating means 18 is hereinafter referred to as the shunt gain and is defined as the ratio of the amplifying current $I_S$ in conductor 20** to the average value of the signal currents $I_{L1}$ and $I_{L2}$ in conductors $12a_1$ and $12a_2$, as shown in equation (2) of FIG. 1. In interpreting equation (2), each current is considered positive when it flows in the direction shown in FIG. 1.

Based on the above definitions, and utilizing the voltage and current sign conventions shown in FIG. 1, it has been found that the overall or composite gain $G_{10}$ which the circuit of FIG. 1 provides to signals transmitted from station 10, that is, the ratio of the percentage of the transmitted signal which is received at station 11 in the presence of the amplifier to the percentage of the transmitted signal which is received at station 11 in the absence of the amplifier, is given by equation (3) of FIG. 1. In the latter equation, $Z_{11}(f)$ is the impedance of the transmission line looking toward station 11, looking in the direction of the arrows, from the amplifier and $Z_{10}(f)$ is the impedance of the transmission line looking toward station 10 from the amplifier. Both of these impedances are generally functions of frequency, as indicated by the notation $(f)$. Thus, the strength of the signal received at the receiving station is a function of the gains of voltage and current generators 13 and 18 and of the impedances $Z_{10}$ and $Z_{11}$ of the transmission line.

Similarly, based upon the same definitions and sign conventions for $R_A$ and $R_B$, the overall or composite gain $G_{11}$ which the circuit of FIG. 1 provides to signals transmitted from station 11 is given by equation (4) of FIG. 1. In comparing equations (3) and (4), it will be seen that corresponding series gains and corresponding shunt gains have opposite signs. This sign difference reflects the fact that voltages $V_1$, $V_2$, $V_3$ and $V_4$ must have the same sign as voltage $V_L$ and currents $I_{L1}$ and $I_{L2}$ must have the same sign as current $I_S$ if generators 13 and 18 are both to aid transmission from station 10, and that voltages $V_1$, $V_2$, $V_3$ and $V_4$ must be opposite in sign from voltage $V_L$ and currents $I_{L1}$ and $I_{L2}$ must be opposite in sign from current $I_S$ if generating means 13 and 18 are both to aid transmission from station 11. Thus, if $R_A$ and $R_B$ are both positive, both the voltage and current generating means aid transmission from station 10, and, if $R_A$ and $R_B$ are both negative, both the voltage and current generating means aid transmission from station 11.

It will be understood, however, that gains $R_A$ and $R_B$ need not both be positive to aid the transmission of a signal from station 10 and that gains $R_A$ and $R_B$ need not both be negative to aid the transmission of a signal from station 11. This is because a sign difference between the series and shunt gains does not prevent the provision of a net composite gain for either direction of transmission so long as the gain contribution from the generator which aids signal transmission overshadows the gain contribution from the generator which opposes signal transmission.

When signals are transmitted simultaneously from both ends of the transmission line, equations (3) and (4) govern the amplitudes of the signals transmitted from stations 10 and 11, respectively. Assuming, for example, that station 10 transmits the dominant or higher amplitude signal and that $R_A$ and $R_B$ are both positive, equation (3) indicates that the gain for signal transmission from station 10 is greater than one, i.e., that the signal from station 10 is amplified. At the same time, equation (4) indicates that the gain for signal transmission from station 11 is less than one, i.e., that the signal from station 11 is attenuated. Similarly, assuming that station 11 transmits the dominant or higher amplitude signal and that $R_A$ and $R_B$ are both negative, equation (4) indicates that gain for signal transmission from station 11 is greater than one and equation (3) indicates that the gain for signal transmission from station 10 is less than one. Thus, the amplifying arrangement shown in FIG. 1 amplifies signals transmitted in the dominant direction and, simultaneously, attenuates signals transmitted in the non-dominant direction. This assures both a stronger signal at the receiving end of the line and an improved return loss for signals reflected from the receiving end.

In order to distinguish the above described conditions of gain, double subscripts such as 10/10 have been adopted. It will be understood that the first term of this subscript identifies the circuit variable being referred to and that the second term thereof indicates the dominant direction of transmission. The symbol $G_{10/10}$, for instance, refers to the composite gain provided to signals transmitted from station 10 when station 10 is the dominant transmitter. Similarly, the symbol $R_{A/10}$ refers to the series gain which exists when station 10 is the dominant transmitter and the symbol $Z_{R11/10}$ refers to the impedance $Z_{R11}$ which exists when station 10 is the dominant transmitter. It will be understood that when the second term of a double subscript is a zero, a condition in which neither station is transmitting is being referred to.

Because the attenuation introduced by a transmission line generally increases as a function of frequency, components of a transmitted signal having frequencies which are near the upper end of the band of frequencies being transmitted are attenuated more than the components of a signal having frequencies near the lower end of the band. This frequency dependent attenuation characteristic results in a distortion which causes the received signal to sound different from the transmitted signal. As will be seen presently, the amplifying arrangement of FIG. 1 allows the composite gain for transmission from either end of the transmission line to vary with frequency in the same manner that the attenuation of the line varies with frequency. This assures that all of the frequency components of a transmitted signal are affected in a similar fashion by transmission through the line. Thus, the amplifying arrangement shown in FIG. 1 is adapted to compensate for the frequency distortion introduced by a frequency responsive transmission line.

In addition to compensating for frequency distortion, the amplifying arrangement of FIG. 1 also alters the impedances presented by the transmission line. The impedance $Z_{11}$ is, for example, seen through the amplifier of the invention as a transformed impedance $Z_{R11}$ and impedance $Z_{10}$ is seen through the amplifier as a transformed impedance $Z_{R10}$. The impedance transformations produced by the amplifier of FIG. 1 vary with series and shunt gains $R_A$ and $R_B$ in accordance with equations (5) and (6) of FIG. 1. Referring to equation (5), it will be seen that for any given frequency and for any given value of $Z_{11}$, $Z_{R11}$ can be made equal to any desired value by selecting suitable values for $R_B$ and $R_A$. $Z_{R11}$ can, for example, be chosen to equal $Z_{10}$ to assure that the impedance looking into the transmission line to the left of amplifier terminals $T_1$ match the impedance looking to the right from those terminals and thereby eliminate the possibility of signal reflections from terminal pair $T_1$. In addition, it will be seen from equations (5) and (6) that the degree of impedance transformation introduced by FIG. 1 is dependent upon both the series and shunt gains and, in particular, is primarily dependent upon the difference ($R_B - R_A$) between them for relatively small values of gain but is increasingly dependent upon the product $R_A R_B$ of them for relatively large values of gain. Thus, the existence of a matched or mismatched relationship between the impedance of the line and the impedance of the amplifier of FIG. 1 is primarily dependent upon the gain difference between the series and shunt gains.

Because the impedance of a transmission line generally decreases as a function of frequency, a line impedance which is matched to an amplifier at frequencies near the upper end of the transmission band is mismatched at frequencies near the lower end of that band. This frequency dependent mismatch causes differing amounts of signal reflection from and signal transmission through an amplifier for differing components of a transmitted signal and results in a distortion or lack of fidelity in the sound of the received signal. As will be seen presently, the amplifying arrangement of FIG. 1 allows the transformed impedances at both inputs of the amplifier to vary with frequency in the same manner as the line impedances at the respective ends of the line. This assures that the impedances of the amplifier may remain matched to the impedances of the transmission line for each frequency in the transmission band. Thus, the amplifying arrangement of FIG. 1 is adapted to establish a frequency dependent impedance match between itself and a transmission line.

In utilizing the invention to provide an amplifier circuit having desirable gain, frequency and impedance matching characteristics, it is desirable to provide circuitry which establishes certain relationships between the variables appearing in equations (3), (4), (5) and (6). With respect to gain, it is desirable that circuitry be provided whereby the gain $G_{10/10}$ provided to signals transmitted from station 10 during dominant transmission therefrom be substantially equal to the gain $G_{11/11}$ provided to signals transmitted from station 11 during dominant transmission therefrom, for each frequency in the transmission band, as shown in equation (7). In addition, it is desirable that the attenuation $G_{10/11}$ provided to signals transmitted from station 10 when station 11 is dominant be substantially equal to the attenuation $G_{11/10}$ provided to signals transmitted from station 11, when station 10 is dominant, for each frequency in the transmission band, as shown in equation (8). These relationships assure that subscribers talking over the transmission line are afforded equal treatment without regard to the end of the line at which they are located. It is also desirable that the gains $G_{10/0}$ and $G_{11/0}$ which exist when neither station transmits a signal sufficient to establish dominant transmission, be substantially equal to one, for each frequency in the transmission band, as shown in equation (9). This assures that the amplifying arrangement of FIG. 1 does not amplify low level signals such as noise and that the amplifier-transmission line system is stable.

With regard to the frequency compensation, it is desirable that circuitry be provided whereby gain $G_{10/10}$ be substantially proportional to the attenuation of the transmission line over the band of frequencies to be transmitted, that is, that $G_{10/10}(f)$ equal $C \cdot A(f)$ where C is a constant of proportionality and A is the ratio of the transmitted signal strength to the received signal strength, in the absence of the amplifier, as shown in equation (10). This condition assures that the relative amplitudes of the different frequency components of a received signal are substantially the same as the relative amplitudes of the different frequency components of a transmitted signal, thus eliminating frequency distortion.

With regard to impedance matching, it is desirable that circuitry be provided whereby impedance $Z_{10}$ is made substantially equal to impedance $Z_{R11}$, for each frequency in the transmission band, under all conditions of transmission, as shown in equation (11). Similarly, it is desirable that impedance $Z_{11}$ be substantially equal to impedance $Z_{R10}$, for each frequency in the transmission band, under all conditions of transmission, as shown in equation (12). These conditions assure that the percentage of signal transmission which is reflected from the amplifier is minimized and that the percentage of signal transmission through the amplifier is maximized.

In accordance with the present invention, there is provided a method and apparatus whereby the previously described advantageous gain, frequency and impedance matching characteristics are provided for each of the states of transmission through the transmission line.

In practicing the method of the present invention, there are performed the following steps: first, introducing in series with the transmission line an amplifying voltage the amplitude of which varies in accordance with the amplitude of the signal voltage across the transmission line; second, introducing in shunt with the transmission line an amplifying current the amplitude of which varies in accordance with the amplitude of the signal current through the transmission line; third, varying $R_A$ and $R_B$ so that equations (13) and (14) of FIG. 1 are substantially satisfied, for each frequency in the transmission band, during the transmission of a dominant signal from station 10; fourth, varying $R_A$ and $R_B$ so that equations (15) and (16) of FIG. 1 are substantially satisfied, for each frequency in the transmission band, during the transmission of a dominant signal from station 11; and fifth, varying $R_A$ and $R_B$ so that equations (17) and (18) of FIG. 1 are substantially satisfied, for each frequency in the transmission band, when neither station 10 nor station 11 transmits. It will be understood that for many transmission lines, the conditions existing when neither station transmits are not critical and that, with respect to those transmission lines, the fifth step may be omitted. One exemplary apparatus which may be utilized to perform these steps will be discussed presently in connection with the circuit of FIG. 2.

In practicing the method comprising the first through fourth steps, when the series and shunt gains utilized during dominant transmission from station 10 are related to the series and shunt gains utilized during dominant transmission from station 11 in accordance with the relations $R_{A/10} = -R_{B/11}$ and $R_{B/10} = -R_{A/11}$, the structure necessary to satisfy equations (13) through (18) is minimized. More specifically, if gains $R_{A/10}$ and $R_{B/10}$ are functions of frequency which substantially satisfy equations (13) and (14) and if $R_{A/11} = -R_{B/10}$ and $R_{B/11} = -R_{A/10}$ for each frequency in the transmission band, $G_{10/10}(f)$ will be equal to $G_{11/11}(f)$ and to $C \cdot A(f)$, $G_{10/11}(f)$ will be equal to $G_{11/10}(f)$, $Z_{R11/10}(f)$ will be equal to $Z_{R11/11}$ and to $Z_{10}(f)$ and $Z_{R10/10}(f)$ will be equal to $Z_{R10/11}(f)$ and to $Z_{11}(f)$. In other words, the circuitry which produces the desired gain and frequency compensating characteristics for a first dominant direction of transmission can, in accordance with the invention, be reconnected in response to reversals in the dominant direction of transmission, to produce the desired gain and frequency compensating characteristics for the other or second dominant direction of transmission. In addition, the same circuitry which equalizes the gains in the two dominant directions of transmission automatically and simultaneously makes equal, on a frequency by frequency basis, the attenuations in the two non-dominant directions of transmission. Furthermore, the circuitry of the invention causes the amount of attenuation provided to a non-dominant talker to be equal, on a frequency by frequency basis, to the amount of gain provided to a dominant talker.

In addition, the circuitry which matches the impedance at one input of the amplifier to that of the line during dominant transmission in one direction also matches the impedance at the other input of the amplifier to that of the line during dominant transmission in the other direction. Furthermore, the same circuitry which matches the impedances of the amplifier and those of the line at the ends of the line which transmit dominant signals automatically and simultaneously provide similar impedance matching at ends of the line which transmit non-dominant signals. Thus, in accordance with the present invention, for a given line, gain control circuitry which satisfies equation pair (13) — (14) can also be utilized to satisfy equation pair (15) — (16) if the connections of the gain control circuitry to the voltage and current generators are controlled in accordance with the then dominant direction of transmission.

FIG. 2

One circuit suitable for practicing the above described method of providing frequency compensated gain in the presence of impedance matching is shown in FIG. 2. The networks comprising the circuit of FIG. 2 are arranged in the same relative positions as the corresponding portions of FIG. 1 and like parts are similarly numbered.

In the embodiment of FIG. 2, amplifying voltage generator 13 includes voltage sensing means 25 having inputs 25*a* and 25*b* and an output 25*c*, amplifying voltage driver means 27 having inputs 27*a* and 27*b* and an output 27*c* and gain-frequency control means 30 comprising gain control circuit means 30*a*, 30*b*, 30*c* and 30*d*. Similarly, amplifying current generator 18 includes current sensing means 26 having an input 26*a* and an output 26*b*, amplifying current driver means 28 having inputs 28*a* and 28*b* and outputs 28*c* and 28*d* and gain-frequency control means 30′ comprising gain control circuit means 30*a*′, 30*b*′, 30*c*′ and 30*d*′. In the following description of FIG. 2, it will be understood that a circuit (or element) such as circuit 30*a*′ having a primed indicia serves the same function as and operates in the same manner as a circuit (or element) such as circuit 30*a* having the corresponding unprimed indicia. Accordingly, only one of such analagous circuits or elements will be described in detail and the other will be understood to operate in a similar manner under similar conditions.

Voltage sensing means 25 serves to sample the signal voltage across the transmission line and to control the potential between output 25*c* thereof and ground in accordance therewith. More specifically, voltage sensing means 25 causes the voltage at output 25*c* thereof to vary positively and negatively with respect to ground when the signal voltage across the transmission line drives input 25*a* thereof positively and negatively, respectively, from input 25*b* thereof. Voltage sensing means of any suitable design having a high input impedance between inputs 25*a* and 25*b* and a low output impedance between output 25*c* and ground may be used.

Current sensing means 26 serves to sample the signal current through the transmission line and to control the potential between output 26*b* thereof and ground in accordance therewith. More specifically, sensing means 26 causes the voltage at output 26*b* thereof to vary positively and negatively with respect to ground when the signal current in the transmission line drives current respectively into and out of input 26*a* thereof. Current sensing means of any suitable design having a low input impedance between input 26*a* thereof and ground and a low output impedance between output 26*b* thereof and ground may be used.

Amplifying voltage driver means 27 serves to induce on windings 14*b*, 14*c*, 14*d* and 14*e* amplifying voltages which vary in accordance with the amplitude of the signal voltage established by voltage sensor 25. When the signal voltage at sensor output 25*c* is applied to driver input 27*a*, which serves as a non-inverting or phase-maintaining input, driver 27 establishes amplifying voltages of the same polarity across transformer windings 14*a*, 14*b*, 14*c*, 14*d* and 14*e*. On the other hand, when the signal voltage at sensor output 25*c* is applied to driver input 27*b*, which serves as an inverting or phase-reversing input, driver 27 establishes amplifying voltages of the opposite polarity across transformer windings 14*a*, 14*b*, 14*c*, 14*d* and 14*e*. Thus, by controlling the input to which the signal voltage at output 25*c* is applied, driver 27 can provide either a non-inverted amplifying voltage to aid dominant transmission from station 10 or an inverted amplifying voltage to aid dominant transmission from station 11.

In the present embodiment, driver 27 includes operational amplifiers 32 and 33 each of which has a non-inverting input *a*, an inverting input *b* and an output *c*. Amplifier 33 serves to energize primary winding 14*a* with an amplifying voltage which varies inversely with changes in the input voltage at driver input 27*b*. Operational amplifiers 32 and 33, taken together, serve to energize winding 14*a* with an amplifying voltage which varies directly with changes in the input voltage at driver input 27*a*. The amount of change in the amplifying voltage for a given change in driver input voltage is determined by the relative magnitudes of resistances such as amplifier input resistor 34 and amplifier feedback resistors 35 and 36. In the present embodiment, it is contemplated that the magnitude of the change in the amplifying voltage which results from a given change in the magnitude of the driver input voltage be the same whether an input voltage is being applied to driver input 27*a* or to driver input 27*b*.

Amplifying current driver means 28 serves to introduce into the transmission line two equal and opposite amplifying currents each of which varies in accordance with the amplitudes of the signal voltage established by current sensor 26. When a positive signal voltage at current sensor output 26*b* is applied to driver input 28*a*, which serves as a non-inverting or phase-maintaining input, driver 27 establishes a positive or upward flowing amplifying current in conductor 20 and establishes an equal negative or downward flowing amplifying current in conductor 21. Similarly, when a positive signal voltage at current sensor output 26*c* is applied to driver input 28*b*, which serves as an inverting or phase-reversing input, driver 27 establishes a negative or downward flowing amplifying current in conductor 20 and establishes an equal positive or upward flowing current in conductor 21. Accordingly, by controlling the driver input to which the signal voltage at sensor output 26*b* is applied, driver 27 can provide either non-inverted amplifying currents to aid dominant transmission from station 10 or inverted amplifying currents to aid dominant transmission from station 11.

In the present embodiment, driver 28 includes operational amplifiers 38, 39 and 40, output current sensing resistors 41 and 42, current feedback resistors 44, 45, 46 and 47 and amplifier feedback resistors 49 and 50. In the environment of driver 28, operational amplifiers 38 and 39 operate as current sources to establish in output conductors 21 and 20, respectively, complementary amplifying currents the magnitudes of which are substantially independent of the impedance of the transmission line. This current-source characteristic results from the action of current feedback resistors 44, 45, 46 and 47 which prevent the currents in current sensing resistors 41 and 42 from deviating from the values set by the signal voltages at driver inputs 28*a* and 28*b*. Circuitry of this type is described, in detail, in the copending application of Frederick J. Kiko, Ser. No. 301,968, entitled Controllable Current Source.

The Gain-Frequency Control Circuitry

Gain-frequency control means 30 serves to vary the amplitude of each frequency component of the voltage which sensor 25 applies to driver 27, in accordance with the frequency of that component, as required, for the ratio $R_A$ of the amplifying voltage to the signal voltage to satisfy equation pairs (13) — (14) and (15) — (16)of FIG. 1 at the frequency of that component. At the same time, gain-frequency control means 30' serves to vary the amplitude of each frequency component of the voltage which current sensor 26 applies to current driver 28, in accordance with the frequency of that component, as required, for the ratio $R_B$ of the amplifying current to the signal current to satisfy equation pairs (13) — (14) and (15) — (16) of FIG. 1, at the frequency of that component. Thus, control means 30 and 30' serve to control the signs and the magnitudes of the amplifying voltages and currents, as required, to provide frequency compensated gain and impedance matching for both directions of transmission through the transmission line.

Gain-frequency control means 30 includes directional control means 30*a*, frequency compensating or gain peaking means 30*b*, impedance compensating or matching means 30*c* and a frequency-impedance coordinating or correcting means 30*d*. Directional control means 30*a* serves to electrically connect sensor output 25c to non-inverting driver input 27*a*, through frequency compensating means 30*b*, when station 10 is the dominant transmitter. Control means 30*a* also serves to connect sensor output 25*c* to inverting driver input 27*b*, through compensating means 30*b*, when station 11 is the dominant transmitter. Thus, direction control means 30*a* controls the inverted or non-inverted phase relationship between the various frequency components of amplifying voltage and those respective components of the driver input signal which are applied to driver 27 through control means 30*a*.

Control means 30*a* includes P- and N-channel junction field effect transistors 52 and 53, respectively, and resistors 54 and 55. Transistor 53 is turned on, by means of a voltage applied through a conductor X, to connect sensor output 25*c* to driver input 27*a* when a direction detector 57 compares the phase relationship between the signals at sensor outputs 25*c* and 26*b*, through conductors 57*b* and 57*c*, and determines therefrom that station 10 is the dominant transmitter. Similarly, transistor 52 is turned on, by means of a voltage applied through a conductor Y, to connect sensor outputs 25*c* to driver input 27*b*, when direction detector 57 compares the signals at sensor outputs 25*c* and 26*b* and determines therefrom that the dominant direction of transmission is from station 11. Phase comparison and control circuitry suitable for use in direction detector 57 is described, in detail, in the U.S. Patent of Charles W. Chambers, Jr., U.S. Pat. No. 3,706,862, entitled "Amplifier Circuit for Transmission Lines."

In the following description of frequency compensating networks 30*b* and 30*b'* and impedance compensating networks 30*c* and 30*c'*, it will be understood that unless otherwise stated, the networks being described are discussed as if they alone determined the transmission characteristics of the circuit of FIG. 2. The simultaneous operation of these networks will be described later in connection with correcting networks 30*d* and 30*d'*.

The Frequency Compensating Circuitry

Frequency compensating means 30*b* serves to increase the percentage of the signal at sensor output 25*c* which is applied to driver input 27*a* or 27*b*, in accordance with the frequency of that signal, as the frequency of that signal increases toward the upper end of the transmission band. In other words, as will be described in more detail presently, network 30*b* applies to driver 27 relatively high percentages of the high frequency components of the signal at sensor output 25*c* and relatively low percentages of the low frequency components of the signal at sensor output 25*c*. Network 30*b* also serves to decrease the percentage of the signal at sensor output 25*c* which is applied to driver input 27*a* or 27*b*, as a function of the frequency of that signal, as the frequency of that signal rises beyond the upper end of the transmission band. Thus, network 30*b* exhibits a signal peaking characteristic.

The increasing portion of this peaking characteristic assures that driver 27 provides lower amplitude amplifying voltage components for aiding the transmission of the low frequency components of the signal voltage and higher amplitude amplifying voltage components for aiding the transmission of the higher frequency components of the signal voltage. As a result, the gain of voltage driver 30 is low for those components of a signal which are least strongly attenuated by, for example, a non-loaded transmission line and is high for those components of a signal which are most strongly attenuated thereby, a condition which reduces the frequency distortion resulting from the frequency dependent attenuation of such lines. The decreasing portion of this peaking characteristic, on the other hand, reduces the amplification provided to those components of the signal voltage which are not in the transmission band and, therefore, not necessary for communication purposes.

In the present embodiment, compensating network 30*b* includes a tank circuit comprising a capacitor 59, an inductor 60, and resistors 61 and 62, each of which may be made adjustable. Capacitor 59, inductor 60 and resistor 61, taken together, and resistor 62, comprise respective sections of a voltage divider network having ends connected between sensor output 25*c* and ground and having a tap 63 connected to driver 27 through network 30*a*. Assuming that capacitor 59 and inductor 60 are selected to be resonant at a frequency substantially equal to the highest frequency in the transmission band, the percentage of the total voltage divider impedance which appears between ground and tap 63, and, therefore, the percentage of the signal voltage at sensor output 25*c* which appears at tap 63, will increase, as a function of frequency, as the frequency of the voltage at sensor output 25*c* rises toward the upper end of the transmission band and will decrease as that frequency rises above the upper end of the transmission band. Thus, the tank circuitry comprising frequency compensating network 30*b* provides a frequency dependent peaking characteristic of a type suitable for varying the series gain $R_A$, with the frequency of the transmitted signal, to counteract the frequency dependent attenuation characteristic which is responsible for frequency distortion.

In the present embodiment, frequency compensating networks 30*b* and 30*b'* are arranged so that the series gain which is attributable to network 30*b* is substantially equal to the shunt gain which is attributable to network 30*b'*. In other words, networks 30*b* and 30*b'* are so arranged that, if they alone determined the series and shunt gains, the series and shunt gains would be equal to each other, at substantially each frequency in the band of frequencies to be transmitted. This assures that networks 30*b* and 30*b'* provide the desired frequency compensation and yet do not directly affect the existence of a matched or mismatched condition at the amplifier circuit terminals, as may be seen from equations (5) and (6). Equality of $R_A$ and $R_B$ also results in the simplification of gain equations (3) and (4) to the equations $G_{10} = 2 + R_A/2 - R_A$ and $G_{11} = 2 - R_A/2 + R_A$, respectively. The above equality of series and shunt gains is herein provided by connecting substantially similar compensating networks 30*b* and 30*b'* to the same inputs of both driver networks, that is, by connecting both networks to the inverting or to the non-inverting inputs of both driver networks, depending on the direction of transmission.

To the end that the individual amplitudes of the various components of the voltage which network 30*b* applies to driver 27 may be adjusted to accommodate the peaking characteristic to the individual line being treated, resistor 62 may comprise a potentiometer. Because the total impedance of voltage divider network 30*b* is a function of frequency, however, resistor 62 adjusts not only the individual amplitudes of the various components of the signal voltage but also their relative amplitudes, i.e., resistor 62 affects the shape as well as the peak amplitude of the frequency characteristic of network 30*b*. Additional control over the shape and peak amplitude of the frequency characteristic of network 30*b* may be had by making resistor 61 a potentiometer. This is because varying resistor 61 varies the Q as well as the overall impedance of the tank comprising capacitor 59 and inductor 60. Thus, by adjustment of resistors 61 and 62, both the peak value and the rate of change of the percentage of signal transmission through frequency compensating network 30b may be adjusted, as required, to accommodate transmission lines having a wide variety of attenuation vs. frequency characteristics.

In a non-loaded transmission line, for example, signal attenuation increases steadily and steeply with the frequency of signal transmission. Accordingly, an amplifier circuit for use in connection with such transmission lines should be adjusted so that the percentage of signal transmission through network 30*b* increases steeply with frequency toward a relatively high peak value. On the other hand, in loaded transmission lines, signal attenuation increases less steeply with frequency. As a result, an amplifier for use in connection with such transmission lines should be adjusted so that the percentage of transmission through network 30*b* increases less steeply with frequency toward a relatively lower peak value.

The Impedance Compensating Circuitry

Impedance compensating means 30*c* and 30*c'* serve to vary series and shunt gains $R_A$ and $R_B$, as functions of frequency, as required, to match the impedance of the amplifier to the impedance of the transmission line for each frequency in the transmission band. Assuming, for example, that impedance $Z_{10}$ is resistive and has a value of 900 ohms over the transmission band and that impedance $Z_{11}$ is reactive and decreases from a value of 1,200 ohms at the low end of the transmission band (e.g., 200 hertz) to a value of 200 ohms at the upper end of the transmission band (e.g., 3,000 hertz), the impedances $Z_{R10}$ and $Z_{R11}$ of the amplifier may be effectively matched to the impedances $Z_{10}$ and $Z_{11}$ of the transmission line not only at 200 and at 3,000 hertz but also for each frequency in between, by utilizing impedance compensating circuitry of the type shown in FIG. 2.

As in the description of frequency compensating circuits 30*b* and 30*b'*, the following description of impedance compensating circuits 30*c* and 30*c'* treats the latter circuits as if they alone determined the transmission characteristics of the circuit of FIG. 2. Thus, the following description of impedance compensating circuits 30*c* and 30*c'* treats circuits 30*a*, 30*b*, 30*d*, 30*a'*, 30*b'*, and 30*d'* as if they had no effect on the circuit of FIG. 2.

In the present embodiment, impedance compensating network 30*c* comprises a first branch or network including a resistor 65 and a second branch or network including a resistor 66 and a capacitor 67. These branches are arranged to exhibit impedances which vary, as respective functions of frequency, to control the amplitudes of the signals at driver inputs 27*a* and 27*b*, as required, to afford the desired impedance compensation. The advantage of utilizing these separate branches is that it allows the amplitude of the signal applied to driver 27 through one branch to be less than the amplitude of the signal applied to driver 27 through the other branch over one portion of the transmission band, and greater than that amplitude over another portion of the transmission band. This, in turn, allows the series gain to be positive for certain components of the transmitted signal and, simultaneously, negative for other components thereof.

Similarly, impedance compensating network 30*c'* comprises a first branch including a resistor 65' and a second branch including a resistor 65' and a capacitor 67'. The resistance and capacitance values of these branches are substantially equal to the corresponding resistance and capacitance values of the corresponding branches of network 30*c*.

The operation of impedance compensating means 30*c* and 30*c'* will now be described. For the amplifier of the invention to lower 1,200 ohm impedance $Z_{11}$ to effectively match it to 900 ohm impedance $Z_{10}$, the term $(R_B - R_A)$ in equation (5) must be negative at the low end of the transmission band. This is because only a term of that sign will cause the quotient in equation (5) to be less than one. On the other hand, at the high end of the transmission band where 200 ohm impedance $Z_{11}$ must be increased to effectively match it to 900 ohm impedance $Z_{10}$, the term $(R_B - R_A)$ in equation (5) must be positive since only a positive sign for that term will cause the quotient in equation (5) to be greater than one. In accordance with one feature of the present invention, both of these conditions are met by impedance compensating networks 30*c* and 30*c'*.

At the low end of the transmission band, for example, the high impedance of capacitor 67 causes the input signal amplitude controlling effect of resistor 65 to predominate over that of resistor 66, with the result that series gain $R_A$ assumes a net positive value. At the same time, capacitor 67' causes the input signal amplitude controlling effect of resistor 65' to predominate over that of resistor 66', with the result that shunt gain $R_B$ assumes a net negative value. These signs for the series and shunt gains cause the term $(R_B - R_A)$ in equation (5) to be negative at the low end of the transmission band. As a result, the amplifier circuit of FIG. 2 steps down 1,200 ohm impedance $Z_{11}$ toward a value $Z_{R11}$ which is equal to 900 ohm impedance $Z_{10}$.

Similarly, at the high end of the transmission band, the low impedance of capacitor 67 assures that the effect of resistor 66 predominates over that of resistor 65, with the result that series gain $R_A$ assumes a net negative value. At the same time, the low impedance of capacitor 67' assures that the effect of resistor 66' predominates over that of resistor 65', with the result that shunt gain $R_B$ assumes a net positive value. These signs for the series and shunt gains cause the term $(R_B - R_A)$ in equation (5) to have a positive value at the high end of the transmission band. As a result, the amplifier circuit steps up 200 ohms impedance $Z_{11}$ toward a value $Z_{R11}$ which is equal to 900 ohm impedance $Z_{10}$. It will be understood that, for suitable values of resistors 65, 65', 66 and 66' and capacitors 67 and 67', impedance compensating network 30*c* and 30*c'* cooperate to effectively match impedance $Z_{R11}$ to impedance $Z_{10}$ not only at the ends of the transmission band, but also for all intermediate frequencies.

Similarly, in order for the amplifier circuit of the invention to raise the 900 ohm impedance $Z_{10}$ to a value necessary to match higher, 1,200 ohm impedance $Z_{11}$ at the low end of the transmission band, and to lower the 900 ohm impedance $Z_{10}$ to match lower, 200 ohm impedance $Z_{11}$ at the high end of the transmission band, the term $(R_B - R_A)$ in equation (6) must be negative at the low end of the transmission band and be positive at the upper end thereof. Both of these conditions are met by impedance compensating networks 30*c* and 30*c'*, as will now be expalined.

At the low end of the transmission band, the high impedance of capacitor 67 causes the input signal amplitude controlling effect of resistor 65 to predominate over that of resistor 66, with the result that series gain $R_A$ is positive. At the same time capacitor 67' causes the input signal amplitude controlling effect of resistor 65' to predominate over that of resistor 66', with the result that shunt gain $R_B$ is negative. Thus, the sign of the term $(R_B - R_A)$ is negative at the low end of the band with the result that 900 ohm impedance $Z_{10}$ is stepped up toward a value $Z_{R10}$ which is equal to 1,200 ohm impedance $Z_{11}$.

Similarly, at the high end of the transmission band, the low impedance of capacitor 67 causes the effect of resistor 66 to predominate over that of resistor 65 with the result that series gain $R_A$ is negative, and capacitor 67' causes the effect of resistor 66', to predominate that of resistor 65', with the result that shunt gain $R_B$ is positive. Thus, the sign of the term $(R_B - R_A)$ is positive at the high end of the band with the result that 900 ohm impedance $Z_{10}$ is stepped down toward a value $Z_{R10}$ which is equal to 200 ohm impedance $Z_{11}$.

Because impedance compensating networks 30*c* and 30*c'* are connected between respective sensor networks 25 and 26 and respective driver networks 27 and 28, for both directions of transmission through the transmission line, the previously described ability of the circuit of the invention to match impedance $Z_{R11}$ to impedance $Z_{10}$ and to match impedance $Z_{R10}$ to impedance $Z_{11}$ is unaffected by changes in the dominant direction of transmission through the transmission line. As a result, the circuit of the invention matches each amplifier impedance to the respective transmission line impedance both when station 10 is the dominant transmitter and when station 11 is the dominant transmitter. Thus, a single impedance compensating network 30*c* associated with driver 27 and a single impedance compensating network 30*c* associated with driver 28 match the impedance of the amplifier circuit of FIG. 2 to a transmission line, for both dominant directions of transmission, and for each frequency in the transmission band.

In the present embodiment, impedance compensating networks 30*c* and 30*c'* are arranged so that the series gain which is attributable to network 30*c* is substantially equal in magnitude but opposite in sign to the shunt gain which is attributable to network 30*c'*. In other words, networks 30*c* and 30*c'* are so arranged that, if they alone determined the series and shunt gains, the series and shunt gains would substantially cancel one another at substantially each frequency in the band of frequencies to be transmitted. This assures that networks 30*c* and 30*c'* provide the desired impedance compensation and yet do not substantially affect the magnitude of the composite gain provided by the amplifier. The above cancellation is herein provided by connecting the first branches of networks 30*c* and 30*c'* to opposite inputs of respective driver networks and also by connecting the second branches of networks 30*c* and 30*c'* to opposite inputs of respective driver networks.

The Correcting Circuitry

When the frequency and impedance compensating networks are used together, each type of network tends to produce the same kind of compensating activity which it produces when it operates separately. This is because under the condition of simultaneous operation, the impedance compensating networks still produce a frequency dependent difference between the series and shunt gains but do so with respect to the peaked gain-frequency characteristics established by the frequency compensating networks. That is, networks 30$c$ and 30$c'$ produce series and shunt gain contributions which deviate the series and shunt gains in opposite directions from the frequency dependent values which they would have in the presence of frequency compensation alone and thereby produce a gain difference which tends to produce the desired impedance matching.

Where frequency compensating networks 30$b$ and 30$b'$ and impedance compensating networks 30$c$ and 30$c'$ operate in the presence of one another, however, the frequency compensating activity of networks 30$b$ and 30$b'$ may alter the impedance compensating activity of networks 30$c$ and 30$c'$ or vice-versa more than is desirable for the purpose of providing simultaneous frequency and impedance compensation. The increase in the series and shunt gains which networks 30$b$ and 30$b'$ provide to establish gain and frequency compensation, for example, may result in a degree of impedance transformation in addition to that provided by networks 30$c$ and 30$c'$ and thereby transform the line impedances more than is desirable for the purpose of producing impedance matching.

In accordance with the present invention and to the end that the frequency and impedance compensating activities may be coordinated there are provided correcting means 30$d$ and 30$d'$ for improving the degree of harmonious coation between the frequency and impedance compensating activities of networks 30$b$, 30$b'$, 30$c$ and 30$c'$, particularly at higher values of series and shunt gain as, for example, at the upper end of the transmission band where the gain product term $R_AR_B$ in equations (5) and (6) may significantly affect the magnitude of the impedance transformation afforded by the circuit of FIG. 2. In the present embodiment, networks 30$d$ and 30$d'$ produce the desired correcting effect by cancelling a controllable portion of the gain difference introduced by impedance compensating means 30$c$ and 30$c'$, respectively, in accordance with the gain peaking activity of frequency compensating means 30$b$ and 30$b'$, respectively, to maintain impedance matching in spite of increases in the series and shunt gains with frequency. In other words, as an increase in the frequency of signal transmission increases the series and shunt gains, correcting means 30$d$ and 30$d'$ cancel an increasing portion of the gain difference introduced by networks 30$c$ and 30$c'$ and thereby maintain that gain difference at the value which affords impedance matching.

In the present embodiment, correcting means 30$d$ includes cancelling means 30$d_1$ including resistors 69 and 70 and a capacitor 71. These elements have resistances and capacitance values which are substantially equal to those of resistors 65 and 66 and capacitor 67, respectively, of impedance compensating network 30$c$. Because resistors 65 and 69 are connected to the respective non-inverting and inverting inputs of driver 27, and because resistor-capacitor branch 66–67 and resistor-capacitor branch 70–71 are connected to the respective inverting and non-inverting inputs of driver 27, the effect of a voltage which is applied to driver inputs 27$a$ and 27$b$ through network 30$c$ tends to be cancelled by the effect of a voltage which is simultaneously applied to driver inputs 27$a$ and 27$b$ through network 30$d_1$.

To the end that cancelling means 30$d_1$ may cancel less than all of the gain introduced by network 30$c$, correcting means 30$d$ includes scaling means 30$d_2$ for setting the percentage of the effect of network 30$c$ which will be cancelled by network 30$d_1$. In the present embodiment, network 30$d_2$ includes resistors 73 and 74. These resistors act as a voltage divider to reduce the cancelling effect of network 30$d_1$ by scaling down or reducing the amplitude of the voltage applied to driver inputs 27$a$ and 27$b$ therethrough. Thus, scaling network 30$d_2$ determines the extent to which network 30$d_1$ cancels the effect of network 30$c$.

To the end that the cancellation afforded by cancelling means 30$d_1$ may vary in a suitable manner with the frequency of signal transmission, networks 30$d_1$ and 30$d_2$ are energized from sensor 25 through peaking network 30$b$, a conductor 76 and a second peaking network 30$d_3$. In the present embodiment, network 30$d_3$ includes a resistance 78, a capacitor 79, an inductor 80 and a resistor 81 which are substantially identical to the corresponding elements of peaking network 30$b$. It will, therefore, be seen that corrector networks 30$d_1$ and 30$d_2$ are energized through two peaking circuits 30$b$ and 30$d_3$ which are connected in cascade. This cascade connection causes the amplitude of the signal applied to driver 27 through cancelling network 30$d_1$ to increase even more steeply with frequency than the amplitude of the output voltage of network 30$b$. The utilization of this arrangement in connection with frequency compensating means 30$b$ and 30$b'$ and impedance compensating means 30$c$ and 30$c'$ results in highly accurate and simultaneous frequency compensation and impedance compensation, for each frequency in the transmission band. Less accurate but still satisfactory coordination of frequency and impedence compensation may be obtained if networks 30$d_3$ and 30$d_3'$ are eliminated, that is, if conductors 76 and 76$'$ are connected directly to resistors 73 and 73$'$, respectively.

In view of the foregoing, it will be seen that gain control networks 30$a$, 30$b$, 30$c$ and 30$d$, taken together, comprise first or series gain-frequency control means for varying the gain of the series voltage generator of which it is a part, as a function of frequency and as required to satisfy equations (13) through (16). In addition, it will be seen that gain control networks 30$a'$, 30$b'$, 30$c'$ and 30$d'$ comprise second or shunt gain-frequency control means for varying the gain of the shunt current generator of which it is a part, as a function of frequency and as required to satisfy equations (13) through (16). Thus, the desired gain, frequency and impedance characteristics set forth in equations (7) through (12), except those incident to the zero state, may be obtained by utilizing only two frequency responsive networks 30 and 30$'$ and by controlling the connections of those networks to voltage and current drivers 27 and 28 in accordance with the dominant direction of transmission.

While many transmission lines require gain, frequency and impedance compensation, other transmission lines require only impedance compensation and still other transmission lines require only frequency compensation and gain. It will be understood that the circuit of the invention is suitable for use in connection with such other transmission lines, either in the form shown in the circuit of FIG. 2 or in various simplified forms which omit circuitry which need not be used in connection with such other lines. If, for example, the circuit of FIG. 2 is to be utilized with a transmission line requiring only gain and frequency compensation, it may be simplified by removing (open-circuiting) impedance matching networks 30$c$ and 30$c'$ and correcting networks 30$d$ and 30$d'$. If, on the other hand, the circuit of FIG. 2 is to be utilized with transmission lines requiring only impedance matching, it may be simplified by removing (open-circuiting) frequency compensating means 30$b$ and 30$b'$, directional selector means 30$a$ and 30$a'$, and impedance correcting means 30$d$ and 30$d'$.

As previously described, it is desirable that the circuit of FIG. 2 match impedances $Z_{R10}$ to $Z_{11}$ and $Z_{R11}$ to $Z_{10}$ and yet provide substantially no composite gain when neither station is transmitting. To the end that this may be accomplished, the power circuits of complementary junction field-effect transistor pair 83 and 84 are connected in series between conductor 76 and ground. In addition, the gate electrodes of those transistors are connected to the X and Y outputs of direction detector 57. These connections assure that, when direction detector 57 senses the absence of transmission and permits transistors 83 and 84 to conduct simultaneously, the voltages applied to driver inputs 27$a$ and 27$b$, through networks 30$a$ and 30$d$, are substantially equal to zero. This simultaneous conduction does not, however, prevent impedance compensating network 30$c$ from applying an impedance compensating voltage to driver inputs 27$a$ and 27$b$. Accordingly, in the absence of transmission through the transmission line, impedance compensating network 30$c$ is effective to produce the desired impedance matching and networks 30$a$, 30 $b$ and 30$d$ are prevented from affording any substantial gain.

Furthermore, since the gain $R_A$ which is imparted by network 30$c$ under the above condition is substantially equal and opposite to the gain $R_B$ which is imparted by network 30$c'$ under the above condition, the effects of networks 30$c$ and 30$c'$ on composite gain cancel each other with the result that the circuit of FIG. 2 does not exhibit any substantial composite gain when neither station transmits. Thus, the circuit of FIG. 2 operates in the desired manner in its zero or neutral state, i.e., in the absence of signal transmission through the transmission line.

In the event that the circuit of the invention is to be utilized in connection with a transmission line which transmits in only one direction, those portions of the circuit which operate to produce amplification for transmission in the undesired direction may be eliminated or rendered inoperative. If, for example, the circuit of FIG. 2 is to amplify transmission only from station 10, amplification for transmission from station 11 may be prevented by disconnecting transistors 52 and 52'. One transmission line in which such unidirectional amplification is desirable is a four-wire trunk in which the two conductor pairs transmit signal information only in respective directions.

In view of the foregoing, it will be seen that amplifying the signals transmitted through a transmission line in accordance with the method of the invention, and in accordance with the apparatus of the invention, provides directionally balanced, frequency compensated gains for both directions of transmission and, simultaneously, provides an impedance match for transmission from either end of the transmission line both in the presence of and in the absence of dominant transmission.

It will be understood that the embodiment herein is for illustrative purposes only and may be changed or modified without departing from the spirit and scope of the invention as defined in the appended claims.

What is claimed is:

1. In an apparatus for modifying the transmission characteristics of a telephone transmission line or the like, the combination of, amplifying voltage driver means for generating an amplifying voltage in aiding relationship to a transmitted signal, said voltage driver means having inverting input means, non-inverting input means and output means, amplifying current driver means for generating an amplifying current in aiding relationship to the transmitted signal, said current driver means having inverting input means, non-inverting input means and output means, voltage sensing means for energizing the input means of said voltage driver means with a signal which varies in accordance with the signal voltage across the transmission line, current sensing means for energizing the input means of said current driver means with a signal which varies in accordance with the signal current through the transmission line, means for applying the amplifying voltage at the output means of said voltage driver means in series with the transmission line, means for applying the amplifying current at the output means of said current driver means in shunt with the transmission line, series tank circuit means for peaking the amplitude of said amplifying voltage as a function of frequency, means for connecting said series tank circuit means between said voltage sensing means and the input means of said voltage driver means, shunt tank circuit means for peaking the amplitude of said amplifying current as a function of frequency, means for connecting said shunt tank circuit means between said current sensing means and the input means of said current driver means, series impedance compensating circuit means for controlling the relative amplitudes of the signals at the inverting and non-inverting input means of said voltage driver means as a function of frequency, shunt impedance compensating circuit means for controlling the relative amplitudes of the signals at the inverting and non-inverting input means of said current driver means as a function of frequency, said series and shunt impedance compensating circuit means each including a first compensating branch having an impedance which varies in a first manner with frequency and a second compensating branch having an impedance which varies in a second manner with frequency, means for connecting the first and second compensating branches of said series impedance compensating circuit means between said voltage sensing means and the respective non-inverting and inverting input means of said voltage driver means, means for connecting the first and second compensating branches of said shunt impedance compensating circuit means between said current sensing means and the respective inverting and non-inverting input means of said current driver means, series correcting circuit means for cancelling a portion of the impedance compensating activity of said series impedance compensating circuit means in accordance with the peaking activity of said series tank circuit means, shunt correcting circuit means for cancelling a portion of the impedance compensating activity of said shunt impedance compensating circuit means in accordance with the peaking activity of said shunt tank circuit means, said series and shunt correcting circuit means each including a first cancelling brach having an impedance which varies in said first manner with frequency and a second cancelling branch having an impedance which varies in said second manner with frequency, means for connecting the first and second cancelling branches of said series correcting circuit means between said series tank circuit means and the respective inverting and non-inverting input means of said voltage driver means and means for connecting the first and second cancelling branches of said shunt correcting circuit means between said shunt tank circuit means and the respective non-inverting and inverting input means of said current driver means.

2. In an apparatus for modifying the transmission characteristics of a telephone transmission line or the like, the combination of, amplifying voltage driver means for generating an amplifying voltage is aiding relationship to a transmitted signal, said voltage driver means having inverting input means, non-inverting input means and output means, amplifying current driver means for generating an amplifying current in aiding relationship to the transmitted signal, said current driver means having inverting input means, non-inverting input means and output means, voltage sensing means for energizing the input means of said voltage driver means with a signal which varies in accordance with the signal voltage across the transmission line, current sensing means for energizing the input means of said current driver means with a signal which varies in accordance with the signal current through the transmission line, means for applying the ampliyfing voltage at the output means of said voltage driver means in series with the transmission line, means for applying the amplifying current at the output means of said current driver means in shunt with the transmission line, first directional control means for connecting said voltage sensing means to the non-inverting input means of said voltage driver means when dominant signals are transmitted in a first direction through the transmission line and to the inverting input means of said voltage driver means when dominant signals are transmitted in a second direction through the transmission line, second directional control means for connecting said current sensing means to the non-inverting input means of said current driver means when dominant signals are transmitted in said first direction and to the inverting input means of said current driver means when dominant signals are transmitted in said second direction, a plurality of frequency compensating means for varying the amplitudes of the signals at the input means of said driver means, as functions of frequency, to compensate for variations in the attenuation of the transmission line, with frequency, over the band of frequencies to be transmitted, a plurality of impedance compensating means for varying the amplitudes of the signals applied to the input means of said driver means, as functions of frequency, to substantially match the impedance of the apparatus to the impedance of the transmission line, at each frequency in the band of frequencies to be transmitted, a plurality of correcting means for cancelling a controllable portion of the impedance compensating activity of said impedance compensating means, as functions of frequency and in accordance with the signal amplitude variations produced by said frequency compensating means, and thereby affording simultaneous frequency and impedance compensation.

3. In an apparatus for modifying the transmission characteristics of a telephone transmission line or the like, the combination of, amplifying voltage driver means for generating an amplifying voltage in aiding relationship to a transmitted signal, said voltage driver means having input means and output means, amplifying current driver means for generating an amplifying current in aiding relationship to the transmitted signal, said current driver means having input means and output means, voltage sensing means for controlling the signal at the input means of said voltage driver means in accordance with the signal voltage across the transmission line, means for applying the amplifying voltage at the output means of said voltage driver means in series with the transmission line, current sensing means for controlling the signal at the input means of said current driver means in accordance with the signal current through the transmission line, means for applying the amplifying current at the output means of said current driver means in shunt with the transmission line, first and second frequency compensating means for varying the amplitudes of the signals at the input means of said voltage and current driver means, respectively, as functions of frequency, to compensate for the frequency dependent attenuation of the transmission line over the band of frequencies to be transmitted, first and second impedance compensating means for varying the amplitudes of the signals at the input means of said voltage and current driver means, as functions of frequency, to substantially match the impedance of the apparatus to the impedance of the transmission line at each frequency in the band of frequencies to be transmitted, first and second correcting means for varying the amplitudes of the signals at the input means of said voltage and current driver means, as functions of frequency, to coordinate the frequency compensating and impedance compensating activites of said frequency and impedance compensating means.

4. In an apparatus for modifying the transmission characteristics of a telephone transmission line or the like, the combination of, amplifying voltage generating means for generating an amplifying voltage in aiding relationship to a transmitted signal, said voltage generating means having input means and output means, amplifying current generating means for generating an amplifying current in aiding relationship to the transmitted signal, said current generating means having input means and output means, means for applying a signal which varies in accordance with the signal voltage across the transmission line to the input means of said voltage generating means, means for applying the amplifying voltage at the output means of said voltage generating means in series with the transmission line, means for applying a signal which varies in accordance with the signal current through the transmission line to the input means of said current generating means, means for applying the amplifying current at the output means of said current generating means across the transmission line, frequency compensating means for varying the gains of said generating means, as functions of frequency, to provide a composite gain that varies in accordance with the attenuation of the transmission line over the band of frequencies to be transmitted, impedance compensating means for varying the gains of said generating means, as functions of frequency, to match the impedances of the apparatus to the impedances of a transmission line over the band of frequencies to be transmitted, impedance-frequency correcting means for varying the gains of said voltage and current generating means to afford simultaneous frequency and impedance compensating activity by said compensating means.

5. An apparatus as set forth in claim 4 in which said amplifying voltage generating means and said amplifying current generating means each have a first operative state in which signals transmitted from a first end of the transmission line are amplified, a second operative state in which signals transmitted from a second end of the transmission line are amplified and which includes means for controlling the operative states of said generating means in accordance with the dominant direction of transmission through the transmission line.

6. An apparatus as set forth in claim 4 in which said frequency compensating means includes signal peaking means for increasing the gains of said generating means, as functions of frequency, as the frequency of signal transmission rises toward a predetermined frequency and for decreasing the gains of said generating means, as functions of frequency, as the frequency of signal transmission rises above said predetermined frequency.

7. An apparatus as set forth in claim 4 in which said impedance compensating means includes means for establishing a difference between the gains of said voltage and current generating means, said impedance compensating means being arranged to vary said difference, as a function of frequency and in accordance with the impedances looking in both directions from the apparatus into the transmission line, to effectively match the impedances of the apparatus to the impedances of the transmission line at each frequency in the band of frequencies to be transmitted.

8. An apparatus as set forth in claim 6 in which said impedance compensating means includes means for establishing a difference between the gains of said voltage and current generating means, said impedance compensating means being arranged to vary said difference, as a function of frequency and in accordance with the impedances looking in both directions from the apparatus into the transmission line, to effectively match the impedances of the apparatus to the impedances of the transmission line at each frequency in the band of frequencies to be transmitted.

9. An apparatus as set forth in claim 8 in which said impedance-frequency correcting means includes cancelling means for reducing the magnitude of said gain difference, as a function of frequency, in accordance with increases in the gain established by said signal peaking means.

10. In an apparatus for modifying the transmission characteristics of a telephone transmission line or the like, the combination of amplifying voltage generating means for generating an amplifying voltage in aiding relationship to a signal transmitted over said line, said voltage generating means having input means and output means, amplifying current generating means for generating an amplifying current in aiding relationship to a signal transmitted over said line, said current generating means having input means and output means, means for applying a signal which varies in accordance with the signal voltage across the transmission line to the input means of said voltage generating means, means for applying the amplifying voltage at the output means of said voltage generating means in series with the transmission line, means for applying a signal which varies in accordance with the signal current through the transmission line to the input means of said current generating means, means for applying the amplifying current at the output means of said current generating means in shunt with the transmission line, said generating means each including gainfrequency control means for varying the gains of said generating means, as functions of frequency, to match the impedance of the transmission characteristic modifying apparatus to the impedance of the transmission line and to provide a composite gain that varies in a compensatory manner with the attenuation of the transmission line over the band of frequencies to be transmitted.

11. An apparatus as set forth in claim 10 in which said amplifying voltage generating means and said amplifying current generating means each have a first operative state wherein signals transmitted from a first end of the transmission line are amplified and a second operative state wherein signals transmitted from a second end of the transmission line are amplified, and which includes means for controlling the operative states of said generating means in accordance with the dominant direction of transmission through the transmission line.

12. In an apparatus for modifying the transmission characteristics of a telephone transmission line or the like, the combination of, amplifying voltage generating means for generating an amplifying voltage in aiding relationship to a transmitted signal, said voltage generating means having input means and output means, amplifying current generating means for generating an amplifying current in aiding relationship to the transmitted signal, said current generating means having input means and output means, means for applying a signal which varies in accordance with the signal voltage across the transmission line to the input means of said voltage generating means, means for applying the amplifying voltage at the output means of said voltage generating means in series with the transmission line, means for applying a signal which varies in accordance with the signal current through the transmission line to the input means of said current generating means, means for applying the amplifying current at the output means of said current generating means in shunt with the transmission line, series frequency compensating means for increasing the amplitude of said amplifying voltage as a function of frequency, as the frequency of signal transmission rises toward a predetermined value and for decreasing the amplitude of said amplifying voltage as a function of frequency, as the frequency of signal transmission rises beyond said predetermined value, shunt frequency compensating means for increasing the amplitude of said amplifying current as a function of frequency, as the frequency of signal transmission rises toward said predetermined value and for decreasing the amplitude of said amplifying current as a function of frequency; as the frequency of signal transmission rises beyond said predetermined value.

13. An apparatus as set forth in claim 12 in which said frequency compensating means include reactance means for setting the frequencies at which the amplitudes of said amplifying voltages and amplifying currents attain their respective maximums and Q-control means for controlling the slopes of the increasing and decreasing portions of said functions of frequency.

14. In an apparatus for modifying the transmission characteristics of a telephone transmission line or the like, the combination of, amplifying voltage driver means for generating an amplifying voltage in aiding relationship to the transmitted signal, said voltage driver means having input means and output means, amplifying current driver means for generating an amplifying current in aiding relationship to the transmitted signal, said current driver means having input means and output means, voltage sensing means for controlling the signal at the input means of said voltage driver means in accordance with the signal voltage across the transmission line, means for applying the amplifying voltage at the output means of said voltage driver means in series with the transmission line, current sensing means for controlling the signal at the input means of said current driver means in accordance with the signal current through the transmission line, means for applying the amplifying current at the output means of said current driver means in shunt with the transmission line, series and shunt frequency compensating means for varying the amplitudes of the signals at the input means of said voltage and current driver means, respectively, as functions of frequency, to compensate for variations in the attenuation of the transmission line as a function of frequency, and thereby cause the relative amplitudes of the different frequency components of the transmitted signal to be substantially the same at the receiving end of the transmission line as at the transmitting end thereof.

15. In an apparatus for modifying the transmission characteristics of a telephone transmission line or the like, the combination of, amplifying voltage generating means for generating an amplifying voltage in aiding relationship to a transmitted signal, said voltage generating means having input means and output means, amplifying current generating means for generating an amplifying current in aiding relationship to the transmitted signal, said current generating means having input means and output means, means for applying a signal which varies in accordance with the signal voltage across the transmission line to the input means of said voltage generating means, means for applying the amplifying voltage at the output means of said voltage generating means in series with the transmission line, means for applying a signal which varies in accordance with the signal current through the transmission line to the input means of said current generating means, means for applying the amplifying current at the output means of said current generating means in shunt with the transmission line, said generating means each including gain control means for varying the gains of said generating means, as a function of frequency, to provide a composite gain that varies in accordance with the attenuation of the transmission line, over the band of frequencies to be transmitted through the transmission line.

16. An apparatus as set forth in claim 15 in which the gains of said voltage and current generating means are substantially equal to one another over the band of frequencies to be transmitted through the transmission line.

17. An apparatus as set forth in claim 15 in which said amplifying voltage generating means and said amplifying current generating means each have a first operative state wherein signals transmitted from a first end of the transmission line are amplified and a second operative state wherein signals transmitted from a second end of the transmission line are amplified, and which includes means for controlling the operative states of said generating means in accordance with the dominant direction of transmission through the transmission line.

18. In an apparatus for modifying the transmission characteristics of a telephone transmission line or the like, the combination of, amplifying voltage driver means for generating an amplifying voltage in aiding relationship to a transmitted signal, said voltage driver means having inverting input means, non-inverting input means and output means, amplifying current driver means for generating an amplifying current in aiding relationship to the transmitted signal, said current driver means having inverting input means, non-inverting input means and output means, first impedance compensating means for controlling the signals at the inverting and non-inverting input means of said voltage driver means in accordance with the amplitude and frequency of the signal voltage, means for applying the amplifying voltage at the output means of said voltage driver means in series with the transmission line, second impedance compensating means for controlling the amplitudes of the signals at the inverting and non-inverting input means of said current driver means in accordance with the amplitude and frequency of the signal current through the transmission line, means for applying the amplifying current at the output means of said current driver means in shunt with the transmission line, said first and second impedance compensating means being adapted to vary the difference between the ratio of amplifying voltage to signal voltage and the ratio of amplifying current to signal current, to match the impedances looking in respective first and second directions from the apparatus to the impedances presented by the apparatus, at each frequency in the band of frequencies to be transmitted.

19. An apparatus as set forth in claim 18 in which said first and second impedance compensating means each comprise reactance means for varying the relative as well as the actual amplitudes of the signals at the inverting and non-inverting input means of the respective driver means, as predetermined functions of frequency.

20. In an apparatus for modifying the transmission characteristics of a telephone transmission line or the like, the combination of, amplifying voltage driver means for generating an amplifying voltage in aiding relationship to a transmitted signal, said voltage driver means having input means and output means, amplifying current driver means for generating an amplifying current in aiding relationship to the transmitted signal, said current driver means having input means and output means, voltage sensing means for controlling the signal at the input means of said voltage driver means in accordance with the signal voltage across the transmission line, means for applying the amplifying voltage at the output means of said voltage driver means in series with the transmission line, current sensing means for controlling the signal at the input means of said current driver means in accordance with the signal current through the transmission line, means for applying the amplifying current at the output means of said current driver means in shunt with the transmission line, first and second impedance compensating means for varying the amplitudes of the signals at the input means of said voltage and current driver means, respectively, as functions of frequency, to equalize the impedance of the transmission line and the impedance of the apparatus, at each frequency in the band of frequencies being transmitted through the transmission line, means for connecting said first impedance compensating network between said voltage sensing means and the input means of said amplifying voltage driver means and means for connecting said second impedance compensating network between said current sensing means and the input means of said amplifying current driver means.

21. An apparatus as set forth in claim 20 in which the ratio of said amplifying voltage to said signal voltage is maintained at a value substantially equal in magnitude but opposite in sign to the ratio of amplifying current to signal current, at each frequency within the band of frequencies to be transmitted through the transmission line.

22. In an apparatus for modifying the transmission characteristics of a telephone transmission line or the like, the combination of, series amplifying means having input means and output means, said series amplifying means serving as means for introducing in series with the transmission line a voltage which varies in accordance with the signal voltage across the transmission line, shunt amplifying means having input means and output means, said shunt amplifying means serving as means for introducing in shunt with the transmission line, a current which varies in accordance with the signal current in the transmission line, means for connecting the input means of said series amplifying means in voltage sensing relationship to the transmission line, means for connecting the input means of said shunt amplifying means in current sensing relationship to the transmission line, means for applying the voltage at the output means of said series amplifying means in series with the transmission line, means for applying the current at the output means of said shunt amplifying means in shunt with the transmission line, said series and shunt amplifying means each including gain control means for varying the gains of said series and shunt amplifying means, as functions of frequency, to maintain between said series and shunt amplifying means a gain difference sufficient to match the impedance of the transmission line to the impedance of the apparatus for each frequency within the band of frequencies to be transmitted.

23. In an apparatus for modifying the transmission characteristics of a telephone transmission line or the like, the combination of, amplifying voltage generating means for generating an amplifying voltage in aiding relationship to a transmitted signal, said voltage generating means having input means and output means, amplifying current generating means for generating an amplifying current in aiding relationship to the transmitted signal, said current generating means having input means and output means, means for applying a signal which varies in accordance with the signal voltage across the transmission line to the input means of said voltage generating means, means for applying the amplifying voltage at the output means of said voltage generating means in series with the transmission line, means for applying a signal which varies in accordance with the signal current through the transmission line to the input means of said current generating means, means for applying the amplifying current at the output means of said current generating means in shunt with the transmission line, gain control means for varying the gains of said voltage and current generating means as functions of frequency, said functions being selected to substantially match the impedance of the transmission line to the impedance of the modifying apparatus, over the band of frequencies to be transmitted.

24. An apparatus as set forth in claim 23 in which the ratio of said amplifying voltage to said signal voltage is maintained at a value substantially equal in magnitude but opposite in sign to the ratio of amplifying current to signal current, at each frequency within the band of frequencies to be transmitted through the transmission line.

25. An apparatus as set forth in claim 23 in which said functions of frequency are selected so that the equation:

$$Z_{10}/Z_{11} = 4 + 2(R_B - R_A) - R_AR_B/4 - 2(R_B - R_A) - R_AR_B$$

is substantially satisfied, where $Z_{10}$ is the impedance of the transmission line looking in a first direction from the apparatus, as a function of frequency, $Z_{11}$ is the impedance of the transmission line looking in a second direction from the apparatus, as a function of frequency, $R_A$ is the ratio of the amplifying voltage to the signal voltage, as a function of frequency, and $R_B$ is the ratio of the amplifying current to the signal current, as a function of frequency.

26. A method of modifying the transmission characteristics of a telephone transmission line or the like comprising the steps of sensing the signal voltage across the transmission line and generating an amplifying voltage which varies in accordance therewith, introducing said amplifying voltage in series with the transmission line, sensing the signal current through the transmission line and generating an amplifying current which varies in accordance therewith, introducing said amplifying current in shunt with the transmission line, varying the ratio of said amplifying voltage to said signal voltage and the ratio of amplifying current to signal current as functions of frequency, to provide a frequency dependent insertion gain which increases with increases in the attenuation of the transmission line, varying the difference between said ratio of amplifying voltage to signal voltage and said ratio of amplifying current to signal current as functions of frequency, to provide a frequency dependent match between the impedances looking in different directions from the point in the transmission line where amplifying voltages and currents are introduced, and reducing the difference between said ratio of amplifying voltage to signal voltage and said ratio of amplifying current to signal current as a function of frequency, to simultaneously provide said frequency dependent insertion gain and said frequency dependent impedance match.

27. A method of modifying the transmission characteristics of a telephone transmission line or the like comprising the steps of sensing the signal voltage across the transmission line and generating an amplifying voltage in accordance therewith, introducing said amplifying voltage in series with the transmission line, sensing the signal current through the transmission line and generating an amplifying current in accordance therewith, introducing said amplifying current in shunt with the transmission line, varying the ratio of amplifying voltage to said signal voltage and the ratio of said amplifying current to said signal current as functions of frequency to establish a composite gain which varies in accordance with the attenuation of the transmission line, over the band of frequencies to be transmitted, varying said ratios as functions of frequency to substantially match the impedances looking in both directions at each of the points in the transmission line at which said amplifying voltage and amplifying current are introduced, at each frequency in the band of frequencies to be transmitted.

28. A method of modifying the transmission characteristics of a telephone transmission line or the like comprising the steps of sensing a signal voltage across the transmission line and generating an amplifying voltage in accordance therewith, introducing said amplifying voltage in series with the transmission line, sensing a signal current through the transmission line and generating an amplifying current in accordance therewith, introducing said amplifying current in shunt with the transmission line, varying the ratio $R_a$ of said amplifying voltage to said signal voltage and the ratio $R_b$ of said amplifying current to said signal current so as to substantially satisfy, for each frequency in the band of frequencies to be transmitted, the relations:

$$C\cdot A=\frac{Z_{10}+Z_{11}}{Z_{11}}\Big/\frac{(2-R_{a/10})}{(2+R_{a/10})}+\frac{Z_{10}}{Z_{11}}\cdot\frac{(2-R_{b/10})}{(2+R_{b/10})}$$

$$C\cdot A=\frac{\dfrac{Z_{10}+Z_{11}}{Z_{10}}}{\dfrac{2+R_{a/11}}{2-R_{a/11}}+\dfrac{Z_{11}}{Z_{10}}\cdot\dfrac{2+R_{b/11}}{2-R_{b/11}}}$$

and $$\frac{Z_{10}}{Z_{11}}=\frac{4+2(R_b-R_a)-R_aR_b}{4-2(R_b-R_a)-R_aR_b}$$

Where $A$ is the attenuation of the transmission line, as a function of frequency, $Z_{10}$ is the impedance of the transmission line, looking from a first point at which amplifying voltage and amplifying current are applied to the transmission line toward the transmitting end of the line, as a function of frequency, $Z_{11}$ is the impedance of the transmission line, looking from a second point at which amplifying voltage and amplifying current are applied to the transmission line toward the receiving end of the line, as a function of frequency, and $C$ is a constant of proportionality.

29. A method of modifying the transmission characteristics of a telephone transmission line or the like comprising the steps of sensing the signal voltage across the transmission line and generating an amplifying voltage which varies in accordance therewith, introducing said amplifying voltage in series with the transmission line, sensing the signal current through the transmission line and generating an amplifying current which varies in accordance therewith, introducing said amplifying current in shunt with the transmission line, increasing the voltage ratio of said amplifying voltage to said signal voltage as a function of frequency, as the frequency of said signal voltage increases toward a predetermined frequency and for decreasing said voltage ratio, as a function of frequency, as the frequency of said signal voltage rises above said predetermined frequency, increasing the current ratio of said amplifying current to said signal current, as a function of frequency, as the frequency of said signal current increases toward said predetermined frequency and decreasing said current ratio as a function of frequency, as the frequency of said signal current rises above said predetermined frequency.

30. A method of modifying the transmission characteristics of a telephone transmission line or the like comprising the steps of sensing a signal voltage across the transmission line and generating an amplifying voltage in accordance therewith, introducting said amplifying voltage in series with the transmission line, sensing a signal current through the transmission line and generating an amplifying current in accordance therewith, introducing said amplifying current in shunt with the transmission line, varying the ratio of said amplifying current to said signal voltage and the ratio of said amplifying current to said signal current, as functions of frequency, to afford a composite gain as a function of frequency, which is dependent upon the attenuation of the transmission line, as a function of frequency, over the band of frequencies to be transmitted.

31. A method of modifying the transmission characteristics of a telephone transmission line or the like comprising the steps of sensing a signal voltage across the transmission line and generating an amplifying voltage in accordance therewith, introducing said amplifying voltage in series with the transmission line, sensing a signal current through the transmission line and generating an amplifying current in accordance therewith, introducing said amplifying current in shunt with the transmission line, varying the ratio $R_A$, of said amplifying voltage to said signal voltage and the ratio $R_B$ of said amplifying current to said signal current so as to satisfy, for substantially all frequencies in the band of frequencies to be transmitted, the equations:

$$C\cdot A=\frac{Z_{10}+Z_{11}}{Z_{11}}\Big/\frac{2-R_{A/10}}{2+R_{A/10}}+\frac{Z_{10}}{Z_{11}}\cdot\frac{2-R_{B/10}}{2+R_{B/10}}$$

$$C\cdot A=\frac{Z_{10}+Z_{11}}{Z_{10}}\Big/\frac{2+R_{A/11}}{2-R_{A/11}}+\frac{Z_{11}}{Z_{10}}\cdot\frac{2+R_{B/11}}{2-R_{B/11}}$$

where A is the attenuation of the transmission line, as a function of frequency, $Z_{10}$ is the impedance of the transmission line, looking from a first point at which amplifying voltage and amplifying current are applied to the transmission line toward the transmitting end of the line, as a function of frequency, $Z_{11}$ is the impedance of the transmission line, looking from a second point at which amplifying voltage and amplifying current are applied to the transmission line toward the receiving end of the line, as a function of frequency, and C is a constant of proportionality.

32. The method of claim 31 including the step of maintaining ratio $R_A$ substantially equal to ratio $R_B$ at each frequency in the band of frequencies being transmitted.

33. A method of modifying the transmission characteristics of a telephone transmission line or the like comprising the steps of sensing a signal voltage across the transmission line and generating an amplifying voltage which varies in accordance therewith, introducing said amplifying voltage in series with the transmission line, sensing a signal current flowing through the transmission line and generating an amplifying current which varies in accordance therewith, introducing said amplifying current in shunt with the transmission line, varying the magnitudes and signs of the ratio of amplifying voltage to signal voltage and the ratio of amplifying current to signal current, as functions of frequency, to establish between said ratios a difference sufficient to match the impedances looking in both directions at each of the places at which amplifying voltage and amplifying current are applied to the transmission line at substantially each frequency within the band of frequencies being transmitted through the transmission line.

34. A method of modifying the transmission characteristics of a telephone transmission line or the like comprising the steps of sensing a signal voltage across the transmission line and generating an amplifying voltage which varies in accordance therewith, introducing said amplifying voltage in series with the transmission line, sensing a signal current flowing through the transmission line and generating an amplifying current which varies in accordance therewith, introducing said amplifying current in shunt with the transmission line, and varying the ratio $R_A$ of said amplifying voltage to said signal voltage and $R_B$ the ratio of said amplifying current to said signal current, with frequency, so as to satisfy, for substantially each frequency in the band of frequencies to be transmitted, the relation:

$$Z_{10}/Z_{11} = 4 + 2\,(R_B - R_A) - R_A R_B/4 - 2\,(R_B - R_A) - R_A R_B$$

where $Z_{10}$ and $Z_{11}$ are the impedances looking into the transmision line, from the places at which amplifying voltage and amplifying current are applied to the transmission line, as functions of frequency.

35. A method as set forth in claim 34 including the step of maintaining $R_A$ approximately equal to $-R_B$, at each frequency in the band of frequencies being transmitted through the transmission line.

* * * * *

UNITED STATES PATENT OFFICE
CERTIFICATE OF CORRECTION

Patent No. 3,818,151 Dated June 18, 1974

Inventor(s) Charles W. Chambers, Jr. and Frederick J. Kiko

It is certified that error appears in the above-identified patent and that said Letters Patent are hereby corrected as shown below:

In the specification, Column 12, line 18, change "outputs" to --output--. Column 16, line 3, change "expalined" to --explained--.

In the claims, Column 21, line 9, change "brach" to --branch--. Column 21, line 25, change "is" to --in--. Column 24, line 66, change "frequency;" to --frequency,--. Column 28, line 25, and Column 32, line 12, change,
"$Z_{10}/Z_{11} = 4 + 2 (R_B - R_A) - R_AR_B/4 - 2 (R_B - R_A) - R_AR_B$"

to -- $\frac{Z_{10}}{Z_{11}} = \frac{4 + 2 (R_B - R_A) - R_AR_B}{4 - 2 (R_B - R_A) - R_AR_B}$ --.

Signed and sealed this 15th day of October 1974.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.